United States Patent
Stokes

(10) Patent No.: US 9,111,140 B2
(45) Date of Patent: Aug. 18, 2015

(54) IDENTIFICATION AND SEPARATION OF FORM AND FEATURE ELEMENTS FROM HANDWRITTEN AND OTHER USER SUPPLIED ELEMENTS

(75) Inventor: Kevin W. Stokes, Shawnee, KS (US)

(73) Assignee: DST Technologies, Inc., Kansas City, MO (US)

( * ) Notice: Subject to any disclaimer, the term of this patent is extended or adjusted under 35 U.S.C. 154(b) by 59 days.

(21) Appl. No.: 13/347,438

(22) Filed: Jan. 10, 2012

(65) Prior Publication Data

US 2013/0177246 A1 Jul. 11, 2013

(51) Int. Cl.
*G06K 9/18* (2006.01)
*G06K 9/00* (2006.01)
*G06K 9/34* (2006.01)

(52) U.S. Cl.
CPC ............ *G06K 9/00456* (2013.01); *G06K 9/346* (2013.01)

(58) Field of Classification Search
None
See application file for complete search history.

(56) References Cited

U.S. PATENT DOCUMENTS

| | | | | |
|---|---|---|---|---|
| 5,038,381 A | * | 8/1991 | Nelson | 382/178 |
| 5,416,849 A | * | 5/1995 | Huang | 382/173 |
| 5,822,454 A | * | 10/1998 | Rangarajan | 382/180 |
| 6,330,357 B1 | * | 12/2001 | Elmenhurst et al. | 382/175 |
| 6,741,737 B1 | * | 5/2004 | Lenoir | 382/176 |
| 7,764,830 B1 | * | 7/2010 | Wnek | 382/159 |
| 7,869,654 B2 | * | 1/2011 | Yamazaki et al. | 382/187 |
| 8,270,720 B1 | * | 9/2012 | Ladd et al. | 382/190 |
| 2007/0036435 A1 | * | 2/2007 | Bhattacharjya | 382/180 |
| 2009/0148039 A1 | * | 6/2009 | Chen et al. | 382/165 |
| 2010/0128922 A1 | * | 5/2010 | Navon et al. | 382/100 |
| 2010/0182631 A1 | * | 7/2010 | King et al. | 358/1.15 |
| 2013/0031145 A1 | * | 1/2013 | Luo et al. | 707/812 |

OTHER PUBLICATIONS

A Generic Form Processing Approach for Large Variant Templates Navon, Y. ; Barkan, E. ; Ophir, B. Document Analysis and Recognition, 2009. ICDAR '09. 10$^{th}$ International Conference, pp. 311-315.*

A Study on Printed Form Processing and Reconstruction Zhi-Hong Zhao ; Xue-dong Tian ; Bao-Lan Guo Machine Learning and Cybernetics, 2002. Proceedings. 2002 International Conference, pp. 1730-1732, vol. 4.*

Form Processing Based on Background Region Analysis Arai, H. ; Odaka, K. Document Analysis and Recognition, 1997., Proceedings of the Fourth International Conference, pp. 164-169, vol. 1.*

A Model-based Form Processing Sub-system Jianchang Mao ; Abayan, M. ; Mohiuddin, K. Pattern Recognition, 1996., Proceedings of the 13$^{th}$ International Conference, pp. 691-695, vol. 3.*

(Continued)

*Primary Examiner* — Vu Le
*Assistant Examiner* — Guillermo Rivera-Martinez
(74) *Attorney, Agent, or Firm* — Lempia Summerfield Katz LLC

(57) ABSTRACT

A system and methods for progressive feature evaluation of an electronic document image to identify user supplied elements is disclosed. The system includes a controller in communication with a storage device configured to receive and accessibly store a generated plurality of candidate images. The controller is operable to analyze the electronic document image to identify a first feature set and a second feature set, wherein each of the first and second feature sets represents a different form feature, compare the first feature set to the second feature set, and define a third feature set based on the intersection of the first and second feature sets, wherein the third feature set represents the user provided elements.

24 Claims, 8 Drawing Sheets

(56) References Cited

OTHER PUBLICATIONS

Arai et al., "Form Processing Based on Background Region Analysis", Aug. 1997, Proceedings of the Fourth International Conference on Document Analysis and Recognition, vol. 1, pp. 164-169.*

Zhao et al., "A Study on Printed Form Processing and Reconstruction", Nov. 2002, Proceedings of the First International Conference on Machme Learning and Cybernetics, vol. 4, pp. 1730-1732.*

Kacem et al., "A System for an automatic reading of student information sheets", Sep. 2011, International Conference on Document Analysis and Recognition, pp. 1265-1269.*

* cited by examiner

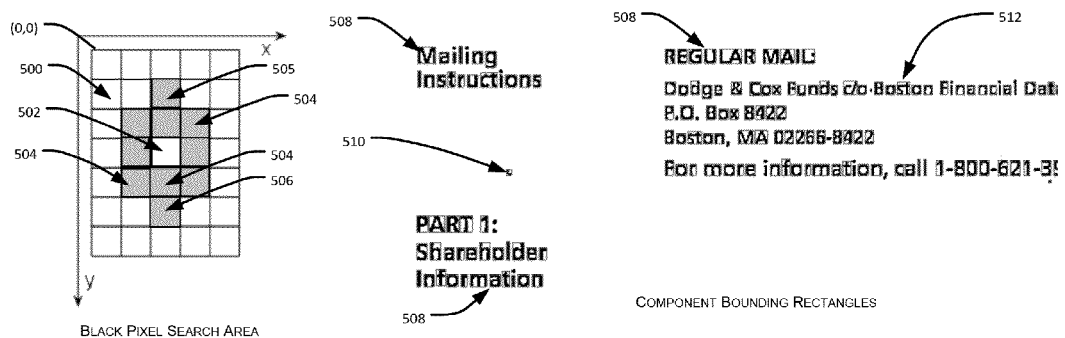
BLACK PIXEL SEARCH AREA
FIG. 5A
COMPONENT BOUNDING RECTANGLES
FIG. 5B
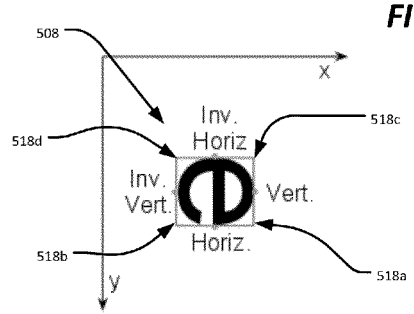
FIG. 5C

IDENTIFICATION AND SEPARATION OF FORM AND FEATURE ELEMENTS FROM HANDWRITTEN AND OTHER USER SUPPLIED ELEMENTS

RELATED APPLICATIONS

This patent document relates to and incorporates information from co-pending U.S. patent application Ser. No. 13/220,387, filed on Aug. 29, 2011 and titled "Candidate Identification by Image Fingerprinting and Model Matching"; and U.S. patent application Ser. No. 13/220,397, filed on Aug. 29, 2011 and titled "System and Method for Candidate Sorting and Clustering". The contents of these patent applications are hereby incorporated by reference to the fullest extent permitted by law.

TECHNICAL FIELD

This patent document discloses and generally relates to a system, method and functionality for identifying user supplied information on a document, and more particularly but not limited to, identification and separation of form and features elements within an electronic document image to facilitate the recognition of handwritten information as well as user supplied marks, stamps and other elements.

BACKGROUND

Electronic documents have replaced traditional physical documents in a number of transactions such as online shopping, electronic bill payment and both business and personal correspondence. As the popularity of electronic documents and transaction gross, there still remains a number of transactions which are mainly performed and executed utilizing traditional physical documents. For example, transactions related to the banking, healthcare and financial industries are often conducted utilizing a physical document in order to preserve the signature or signatures of the executing parties. In these instances, the transactions and signatures are often memorialized on standardized forms containing preprinted typographical elements corresponding to required information.

Upon completion of these forms by a user, the documents may be physically sent or electronically communicated to a document receiving organization for further collating and processing. The document receiving organization may be contracted to clients within the banking, healthcare and financial industries and charged with reviewing and verifying each of the received physical documents or electronic document images. The review and verification processes performed by the document receiving organization ensure the presence of required information such as, for example, signatures, account numbers, contact information, notary or other governmental seals and the like. Information gathered during the review and verification processes is, in turn, entered into a database for use by the contracting clients.

Known review and verification processes are time-consuming and manually intensive. Automated review and verification processes are unreliable due to the vast numbers and versions of forms that may be provided to the document receiving organizations. Document receiving organization may desire an efficient and reliable mechanism for automating the review and verification process by identifying and separating user provided information from the form.

BRIEF DESCRIPTION OF THE FIGURES

FIGS. 5A to 5C are images depicting the steps or processes shown in FIG. 4;

FIGS. 6A to 6C illustrate features and feature sets detected according to the teaching and disclosure provided herein.

DETAILED DESCRIPTION

The system and methods disclosed and discussed in this patent document relate to a mechanism and algorithm for performing a progressive feature evaluation on an electronic document image of each form received by a document receiving organization. The progressive feature evaluation provides a tool for analyzing the elements of an electronic document image to identify and separate individual features of each form in order to highlight the user provided information that the form was intended to gather. In operation, progressive feature evaluation iteratively analyzes the electronic document image to identify a particular feature and feature set within each form. A collection of each of the identified features and feature sets can be assembled to construct or define a layer. Multiple layers, each of which is associated with an identified feature and feature set, can be combined and compared to highlight the handwritten and other user supplied information.

I. System Overview

Figure 1:
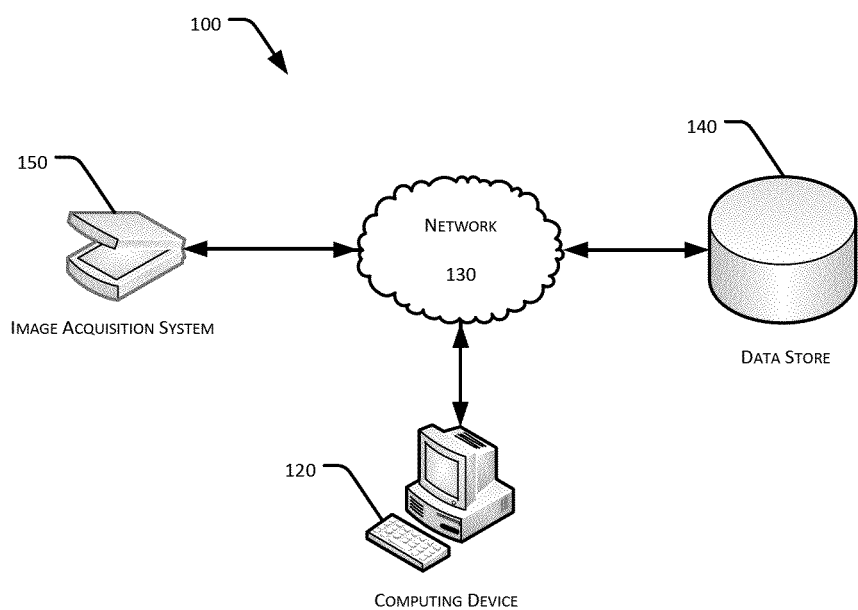
FIG. 1 is a general overview of a system configured to implement a progressive feature evaluation algorithm and process according to the teaching and disclosure provided herein.

FIG. 1 provides a general overview of a system 100 for an exemplary progressive feature evaluation algorithm and process that may be implemented by a document receiving organization. The displayed representation is intended to illustrate one possible configuration of the system 100, and other configurations can include fewer components or additional components. Variations in the arrangement and type of these components may be made without departing from the spirit or scope of the claims as set forth herein. These changes in configurations and components can increase or alter the capabilities of the system 100.

The exemplary system 100 includes a computing device 120, a network 130, a data store 140, and an image acquisition device 150. The computing device 120, in this embodiment, displays and provides an operator interface for use by an operator. The image acquisition device 150 may simply receive candidate or candidate images from other sources or terminals connected through the network 130. Alternatively, or in addition to, the image acquisition device 150 may be used to create one or more electronic or candidate images captured from one or more paper documents containing typographic, graphical or other information corresponding to, for example, a form and handwritten information provided by a form filer.

The graphical and typographic information contained or represented by each candidate image or electronic document image corresponds to typographic information of forms of varying document or candidate types that are received by the system 100. The graphical and typographic information may be information printed, or applied, to the medium by a machine, such as an inkjet or laser printer. The graphical and typographic information may be identified by any number of characteristics, such as typeface, color, point size, line length, leading space, tracking space, kerning space, pixel count, pixel density, brightness. The graphical and typographic information may indicate where handwritten information should be applied to the medium using lines, boxes or other indicators that provide visual cues to where handwritten information should be provided. The handwritten information may be applied to the medium using a writing implement, such as a pen, pencil, stylus, marker, crayon or other writing instruments. The writing implement, in another embodiment, may be a handheld device for applying information on a medium that can create a smooth, controllable line. Information may further be provided or recorded on the medium via, for example, a typewriter, a label maker, laser or inkjet printers or other electronic and/or mechanical means.

A. Image Acquisition Device

The image acquisition device 150 may be a device capable of converting information contained on the medium into an electronic document image or otherwise receiving electronic document images from another source, such as from a storage device or via a wired or wireless network. For example, the image acquisition device 150 may be a scanner or other digital image capture device. The image acquisition device 150 communicates with the computing device 120 and the data store 140 through the network 130. Alternatively, or in addition-to, the image acquisition device 150 may be in direct communication with one or more of the computing device 120 or the data store 140 utilizing a wired connection such as a universal serial bus (USB) connection, a serial connection or other known or later developed connection scheme or protocol. In yet another embodiment, the image acquisition device 150 may be combined with or include elements of the computing device 120 or the data store 140. For example, the image acquisition device 150 may be a handheld device with a camera that can capture an image of a document, such as a smartphone or tablet including a camera or generally any handheld device capable of generating an electronic document image from a physical document. The image acquisition device 150 may be one source of some or all of the noise and artifacts introduced into the candidate image. For example, as the image acquisition device 150 scans and captures the candidate image, slight amounts of image skew and/or changes in the image scale may be introduced.

In an embodiment, an operator or user monitors the progress of the system 100 via an operator interface (not shown) configured to facilitate the review of the electronic document images generated by the image acquisition device 150. If the system 100 is unable to identify a document or candidate type corresponding to a received electronic document image, the operator may interact with the operator interface to manually identify the document or candidate type corresponding to the received electronic document image.

B. Data Store

The data store 140 may be operative to store information, patterns and details relating to the candidate, candidate image and/or electronic document. The stored information may include transformations of the electronic document images, the typographic information, or any other data related to the system 100. The other data related to the system 100 may include information describing known sample and feature sets, characteristics and other information such as electronic data depicting and describing forms used by the organization.

The data store 140 represents one or more relational databases or other data stores managed using various known database management techniques, such as, for example, SQL and object-based techniques. The data store 140 implements using one or more magnetic, optical, solid state or tape drives, or other storage mediums available now or later developed.

In this embodiment the data store 140 is shown in communication with the computing device 120 via the network 130. In this configuration, the data store 140 implements as a database server running MICROSOFT SQL SERVER®, ORACLE®, IBM DB2® or any other database software. The data store 140 may further be in communication with other computing devices and servers through the network 130.

C. Network

The network 130 may include wide area networks (WAN), such as the Internet, local area networks (LAN), campus area networks, metropolitan area networks, or any other networks that may facilitate data communication. The network 130 may be divided into sub-networks that allow access to all of the other components connected to the network 130 in the system 100. Alternatively, the sub-networks may restrict access between the components connected to the network 130. The network 130 may be configured as a public or private network connection and may include, for example, a virtual private network or an encryption scheme that may be employed over the public Internet.

D. Computing Device

The computing device 120 may be connected to the network 130 in any configuration that supports data transfer. These configurations include both wired and wireless data connections to the network 130. The computing device 120 can further run a web application on any platform that supports web content, such as a web browser or a computer, a mobile phone, personal digital assistant (PDA), and/or any appliance or device capable of data communications.

The computing device 120 will typically include processor, memory, a display, a user interface and a communication interface. The processor may be operatively coupled with the memory, display and the interfaces and to perform tasks at the request of the standalone application or the underlying operating system. Herein, the phrases "coupled with", "in communication with" and "connected to" are defined to mean components arranged to directly or indirectly exchange information, data and commands through one or more intermediate components. The intermediate components may include both hardware and software based components.

The memory represents any hardware configuration capable of storing data. The display operatively couples to the memory and the processor in order to display information to the operator. The user interface, in turn, is stored in the memory and executed by the processor for display via the display. The user interface provides a mechanism by which an operator can interact with the system and matching program and algorithm. From the above descriptions, it is to be inferred that the system and method for progressive feature evaluation algorithm and process is highly adaptable and configurable. The flexible nature of the disclosed system and method allow for a wide variety of implementations and uses for the discussed and disclosed technology and algorithms.

Herein, the phrase "operatively coupled" is defined to mean two or more devices configured to share resources or information either directly or indirectly through one or more intermediate components. The communication interface may be operatively coupled with the memory, and the processor, and may be capable of communicating through the network 130 with the image acquisition device 150. The standalone application may be programmed in any programming language that supports communication protocols. Examples of these languages include: SUN JAVA®, C++, C#, ASP, SUN JAVASCRIPT®, asynchronous SUN JAVASCRIPT®, or ADOBE FLASH ACTION SCRIPT®, amongst others.

The computing device 120 may be any mobile device that has a data connection and may run a mobile application. The data connection may be a cellular connection, a wireless data connection, an Internet connection, an infrared connection, a Bluetooth connection, or any other connection capable of transmitting data. For example, the mobile application may be an application running on an iPhone™ available from Apple, Inc.

E. Computing System Layout

Figure 2:
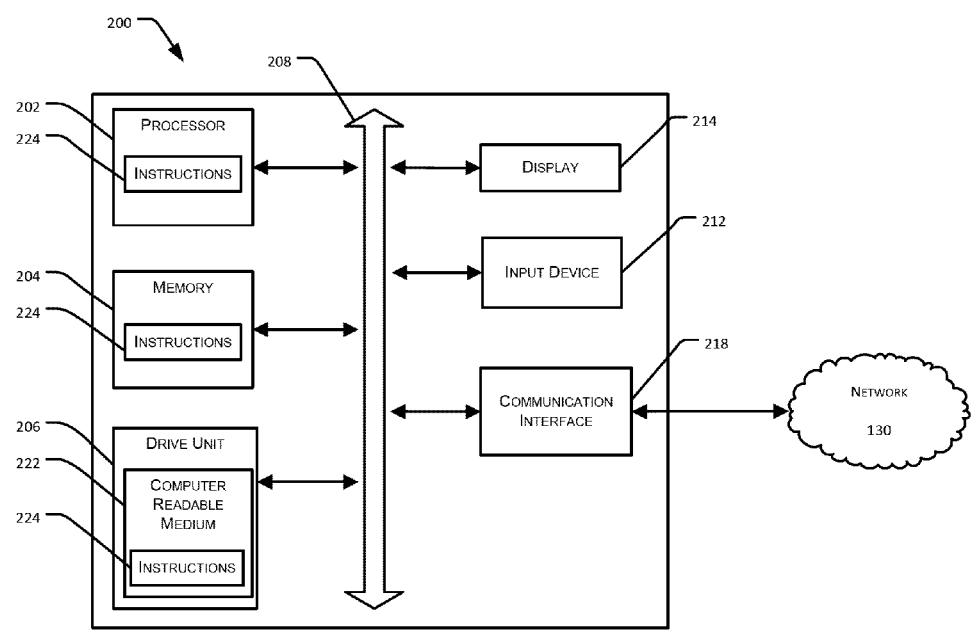
FIG. 2 illustrates a general computer system that may be used in the system of FIG. 1, or other systems for progressive feature evaluation.

FIG. 2 illustrates a layout and configuration for a generalized computer system 200 such as the computing device 120, or any of the other computing devices referenced herein. The computer system 200 stores and executes algorithms and processor-executable instructions 224 to cause the performance of any one or more of the methods or computer based functions discussed and disclosed in this patent document. The computer system 200 may operate as a standalone device or may be connected to other computer systems or peripheral devices.

In a networked deployment, the computer system 200 may operate in the capacity of either a server or a client computer in a server-client network environment, or as a peer computer system in a peer-to-peer (or distributed) network environment. The computer system 200 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing the processor-executable instructions 224 (sequential or otherwise) that specify actions to be taken by that machine. In a particular embodiment, the computer system 200 may be implemented using electronic devices that provide voice, video or data communication. Further, while a single computer system 200 may be illustrated, the term "system" shall also be taken to include any collection of systems or sub-systems that individually or jointly execute a set, or multiple sets, of processor-executable instructions to perform one or more functions via the network 130.

As illustrated in FIG. 2, the computer system 200 includes a processor 202, such as, a central processing unit (CPU), a graphics-processing unit (GPU), or both. The processor 202 may be a component in a variety of systems. For example, the processor 202 may be part of a standard personal computer or a workstation. The processor hardware may incorporate one or more general processors, digital signal processors, application specific integrated circuits, field programmable gate arrays, servers, networks, digital circuits, analog circuits, combinations thereof, or other now known or later developed devices for analyzing and processing data.

The computer system 200 may include a memory 204 that can communicate via a bus 208. The memory 204 can be divided or segmented into, for example, a main memory, a static memory, and a dynamic memory. The memory 204 includes, but may not be limited to, computer readable storage media and various types of volatile and non-volatile storage media such as: random access memory; read-only memory; programmable read-only memory; electrically programmable read-only memory; electrically erasable read-only memory; flash memory; magnetic tape or disk; optical media and the like. In one case, the memory 204 includes a cache or random access memory for the processor 202. Alternatively, or in addition to, the memory 204 may be system memory that is separated and/or distinct from the processor 202.

The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is configured to store processor-executable instructions 224 utilizable by the processor 202. The functions, acts or tasks illustrated in the figures or described herein may be performed by the programmed processor 202 executing the instructions 224 stored in the memory 204. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system 200 may further include a display 214, such as a liquid crystal display (LCD), an organic light emitting diode (OLED), a flat panel display, a solid state display, a cathode ray tube (CRT), a projector, a printer or other now known or later developed display device for outputting determined information. The display 214 acts as an interface for the user to see the functioning of the processor 202 and interact with the software (including the processor-executable instructions 224) stored in the memory 204 or in the drive unit 206.

The computer system 200 further includes an input device 212 configured to allow a user to interact with any of the components of system 200. The input device 212 may be a number pad, a keyboard, or a cursor control device, such as a mouse, or a joystick, touch screen display, remote control or any other device operative to interact with the system 200.

The computer system 200, in other embodiments, includes a disk or optical drive unit 206 to accessibly interpret computer-readable medium 222 on which software embodying algorithms or processor-executable instructions 224 is embedded. The algorithms or processor-executable instructions 224 perform one or more of the methods or logic as described herein. The algorithms 224 may reside completely, or at least partially, within the memory 204 and/or within the processor 202 during execution by the computer system 200. The memory 204 and the processor 202 also may include other forms or configurations of computer-readable media as discussed above.

The present disclosure contemplates a computer-readable medium 222 that includes processor-executable instructions 224 or receives and executes instructions 224 responsive to a propagated signal; so that a device connected to a network 130 may communicate voice, video, audio, images or any other data over the network 130. Further, the processor-executable instructions 224 may be transmitted or received over the network 130 via a communication interface 218. The communication interface 218 may be implemented in software or may be a physical connection in hardware. The communication interface 218 provides a connection with the network 130, external media, the display 214, or any other components in system 200 or combinations thereof. In one embodiment, the connection with the network 130 is a physical connection such as a wired Ethernet connection or may be established wirelessly such as via a cellular telephone network (GSM, CDMA, etc.), an IEEE 802.11 (WiFi) network, an 802.16 (WiMax) network, an 802.20 (wireless broadband) network, and a Bluetooth or personal area network (PAN). The network 130 in other embodiments can be a public network, such as the Internet, a private network, such as an intranet, or combinations thereof, and may utilize a variety of networking protocols now available or later developed including, but not limited to TCP/IP based networking protocols.

The computer-readable medium 222 may be a single medium or may comprise multiple media such as a centralized or distributed database and/or associated caches and servers that store one or more sets of instructions. The term "computer-readable medium" is generally utilized to describe any medium that may be capable of storing, encoding or carrying an algorithm or set of instructions for execution by a processor or that may cause a computer system to perform any one or more of the methods or operations disclosed herein.

The computer-readable medium 222 may include a solid-state memory such as a memory card or other package that houses one or more non-volatile read-only memories. The computer-readable medium 222 further includes or encompasses random access memory or other volatile re-writable memory. Additionally, the computer-readable medium 222 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. The present disclosure may be considered to include any one or more of a computer-readable medium or a distribution medium and other equivalents and successor media, in which data or instructions may be stored.

In other embodiments, dedicated hardware implementations, such as application specific integrated circuits (ASIC), programmable logic arrays and other hardware devices, may be constructed to implement one or more of the methods described herein. Applications that include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

II. Progressive Feature Evaluation

In one embodiment of the exemplary system 100, the processor-executable instructions 224 may be programmed to implement a progressive feature evaluation (PFE) algorithm and process 300. The PFE algorithm 300, in turn, begins with the receipt of an electronic document image representing an electronic document image (EDI) from the image acquisition device 150 (step 302). The electronic document image may, prior to receipt by the PFE algorithm 300, be corrected to remove, identify and/or quantify any rotation, skew and scaling imparted by the image acquisition device 150. The pre-processing and/or image correction may be performed according to the principles disclosed in co-pending U.S. patent application Ser. No. 13/220,387 (10098-11547A US), filed on Aug. 29, 2011 and titled "Candidate Identification by Image Fingerprinting and Model Matching."

Figure 6A:
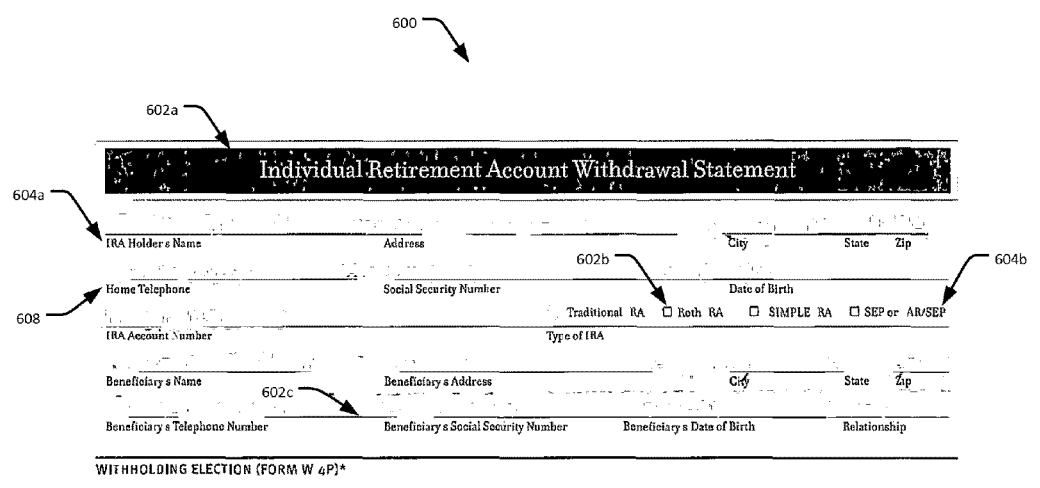
Figure 6B:
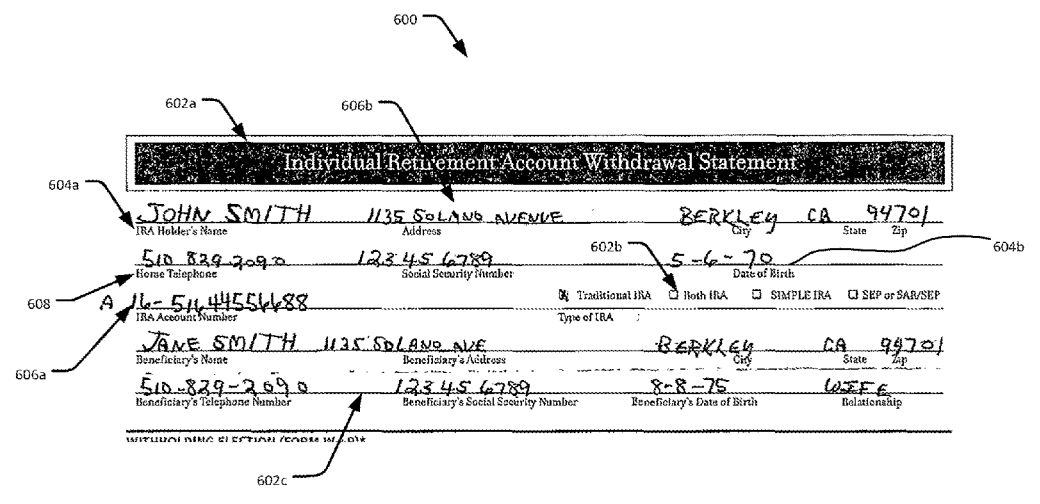

The electronic document image may, in one exemplary embodiment, be a 200 pixel by 200 pixel (200×200) digital image representing a form 600 (see FIG. 6A). The form 600 may include a plurality of form features such as dark blocks 602*a*, checkboxes 602*b* and lines 602*c*. The form 600 may further include form fields such as a name 604*a* and date of birth 604*b*. The form fields 604, in turn, define and identify a position or location on the form 600 set aside to receive a user defined element (see FIG. 6B) such as an account number 606*a* and an address 606*b*. The form 600 may further include other artifacts such as smudges, coffee rings, stamps, barcodes, scanner noise and or any other additional information that can complicate the recognition and identification process.

The PFE algorithm 300 iteratively analyzes the received electronic document image 600 in conjunction with a number of filters configured to identify or highlight individual features of interest on the document. These highlighted features can, in turn, be grouped based on one or more common characteristic to define a feature set associated with each filter. One exemplary filter may be configured to identify small character 608 such as the fine print. In order to identify each of the small characters 608, the PFE algorithm 300 may execute a pixel-by-pixel analysis 400 of the electronic document image represented by the form 600.

A. Pixel-by-Pixel Analysis

The exemplary pixel analysis algorithm 400 initiated by the PFE algorithm 300 begins by subjecting the received electronic document image to a pixel scan (step 402). The pixel scan successively evaluates each pixel of the electronic document image until a black pixel is identified (step 404). For example, the pixel-by-pixel analysis of the 5×7 pixel portion of the received candidate image shown in FIG. 5A begins in the top left corner of the image designated the origin (0,0). The pixel analysis begins a scan of the candidate image and checks each pixel proceeding from left to right and top to bottom. Upon identification of the black pixel, the pixel location (e.g., x, y coordinate) is stored in the memory 204 (step 406). To avoid re-detection, the pixel (step 408) color or value is set from black to white (e.g., from zero (0) to one (1)).

The pixel analysis algorithm 400 upon detection of a black pixel, initiates a neighbor analysis (step 410) centered on the stored x, y coordinates of the detected pixel. The neighbor analysis, as the name implies, evaluates pixels near or neighboring the stored x, y coordinates of the detected black pixel (step 412). For example, the "neighborhood" of the detected black pixel can be defined as the 8 pixels immediately adjacent to the initial stored x, y coordinate. The neighbor analysis sub-process (see step 410) loops until there are no more black pixels detected at any of these locations around the initial stored x, y coordinate (step 414). Upon detection of each black pixel, the location (e.g., x, y coordinate) of the pixel is stored in the memory 204 (step 416). All black pixels that are considered neighbors of the current pixel are saved to the memory 204 and set to white to avoid re-evaluation (step 418). The pixel analysis algorithm 400 iteratively executes the neighbor analysis (see step 410) until each pixel within a neighborhood of one of the detected black pixel has been evaluated (step 420). In this way, groups of connected or adjacent black pixels can be detected and stored.

When no more black pixels are detected in the neighborhood of any other black pixel, the minimum x, maximum x, minimum y, and maximum y values stored in the memory 204 are utilized to define boundary rectangle (step 422). The boundary rectangle represents a perimeter encompassing the detected collection of adjacent black pixels that comprise a component such as a letter, line or other information on the form. Upon completion of the neighbor analysis (see step 410) the boundary rectangle information is stored to the memory 204 as an output (step 424). The pixel analysis algorithm 400 analyzes aspect ratio or area of the boundary rectangle (step 426) against minimum and maximum area variable to ensure correct identification of the feature of interest (i.e., the feature being identified in any given analysis of the form 600.) For example, given a 200×200 resolution electronic document image, a minimum area of 20 pixels and maximum area of 200 pixels may be established for the small characters 608. For a higher resolution electronic document image (e.g., a 300×300 image) the minimum and maximum areas may be proportionally adjusted to 30 pixels and 300 pixels, respectively. The analysis performed by the pixel analysis algorithm 400 may further ensure that the identified boundary rectangle is at least 6 pixels wide by 6 pixels high but-net does not exceed 20 pixels in height. Any feature satisfying these thresholds may be considered to be a small character 608 and stored in the memory 204.

The algorithm 400 continues to loop (back to step 402) and process each black pixel detected within the candidate image until the end of the image information had been detected (step 428).

A pixel's 'neighbor' is determined by parameters that define how close (in terms of pixels) two black pixels must be in order to be considered connected. For example, as discussed above the small character 608 pixel's neighbors or neighborhood may consist of the 8 pixels immediately adjacent to a detected black pixel. Alternatively and as a shown in FIG. 5A, the neighborhood 500 may be defined by filter values establishing an x distance of one (1) pixel and a y distance of two (2) pixels for the small characters 608. Stated another way, the neighborhood of the initial stored x, y coordinate includes the eight (8) pixels (generally identified by the reference numeral 504) immediately surrounding the starting pixel 502. The neighborhood 500 can further include the two pixels 505 and 506 directly above and directly below the starting pixel. In this instance, the intervening pixel 504 can be either a white (1) or black (0) black pixel. In this way, pixels that are immediately diagonal of the starting pixel are also connected and identified as neighbors. The pixels beyond the immediate diagonals are not considered connected or neighbors regardless of the x and y distance values. The particular filter x and y values of the neighborhood 500 can be adjusted to isolate different features and/to achieve a desired scan accuracy, speed and result.

FIG. 5B shows examples of a portion of an exemplary electronic document image after a plurality of boundary rectangles 508 representing the individual small characters are selected to establish a small character feature set. The individual boundary rectangles 508 share common aspect ratios or area characteristics such that the connected black pixels satisfy the defined minimum and maximum area filter values. After the algorithm 400 identifies each boundary rectangle 508; the properties, e.g., the width, height, aspect ratio, area and position, of any filtered rectangle are stored in the memory 204. In this illustrated portion of the electronic document image, it should be noted that fax and scanner noise 510 results in one or more adjacent characters being linked together into a single component. However, because the fax and scanner noise 510 does not satisfy the defined minimum and maximum aspect ratio threshold, the pixel analysis algorithm 400 may ignore these artifacts. In this way, periods and fax/scanner noise 510 can, in some embodiments and configurations, be filtered out and ignored due to their small size which may be determined in terms of the number of identified or connected black pixels. Dashes ("-") and certain characters such as the letter "i" may further be filtered out and/or ignored by the pixel analysis algorithm 400 based on their orientation (i.e., they are either a purely vertical or purely horizontal character) or narrow dimension (i.e., they are only one or two pixels wide).

The aspect ratio or area of the boundary rectangles 508 stored in the memory 204 may be derived based on, for example, intersection or outermost points of the boundary rectangle 508. In particular and as shown in FIG. 5C, corners 518a and 518d and/or corners 518b and 518c may be utilized to calculate the aspect ratio for each boundary rectangle 508.

Figure 6C:
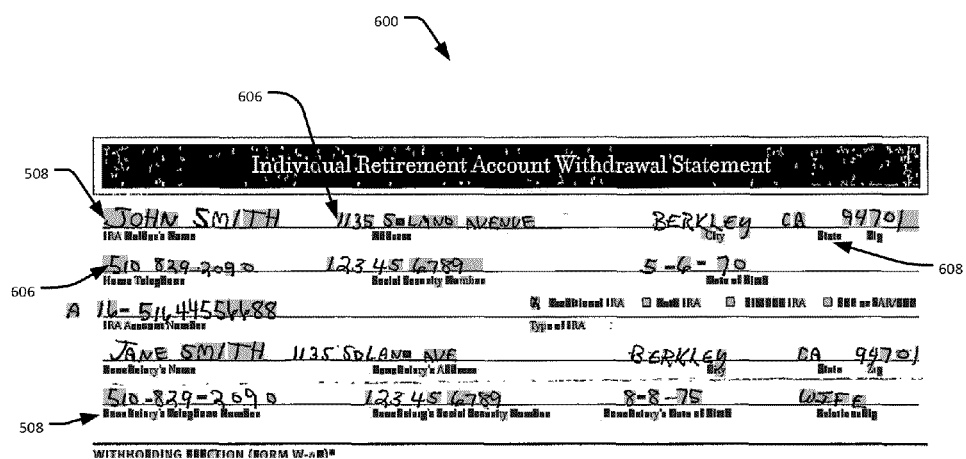

Upon completion of the pixel analysis algorithm 400 and identification of each qualifying boundary rectangle 508, the location and other field information may be accessibly stored in the memory 204. The stored location and field information represents boundary rectangles 508 encompassing small characters 608 and user defined elements 606 that satisfy the defined area and neighborhood values. FIG. 6C represents an embodiment of the form 600 showing the qualifying small characters 608 and user defined elements 606 detected by the pixel analysis algorithm 400 when implementing a small character filter.

B. Electronic Document Image Filters and Analysis

Figure 3:
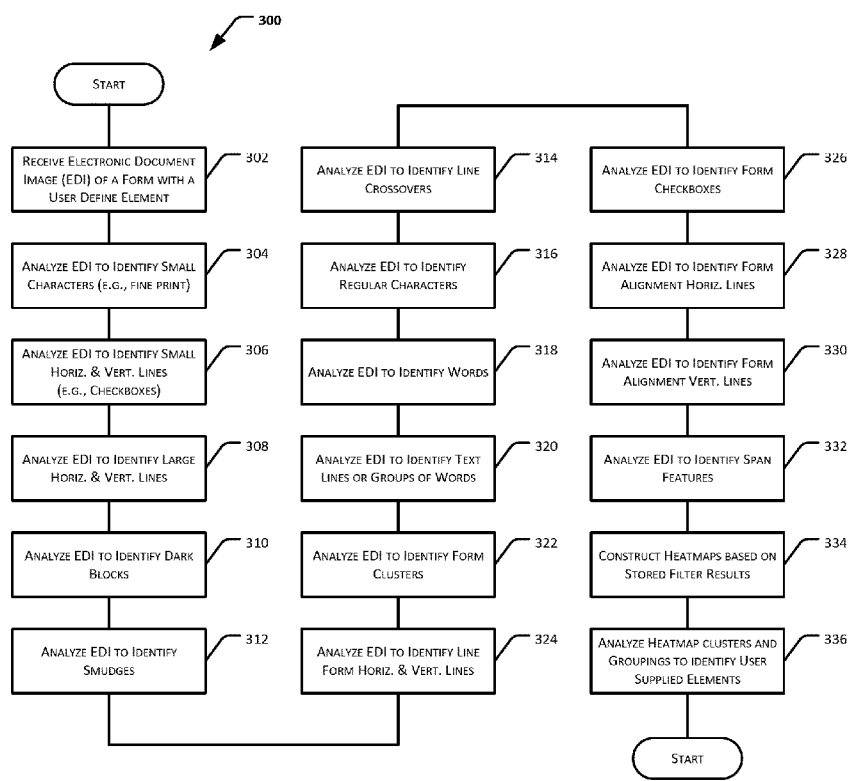
FIG. 3 is a flowchart illustrating an exemplary progressive feature evaluation algorithm and process.
Figure 4:
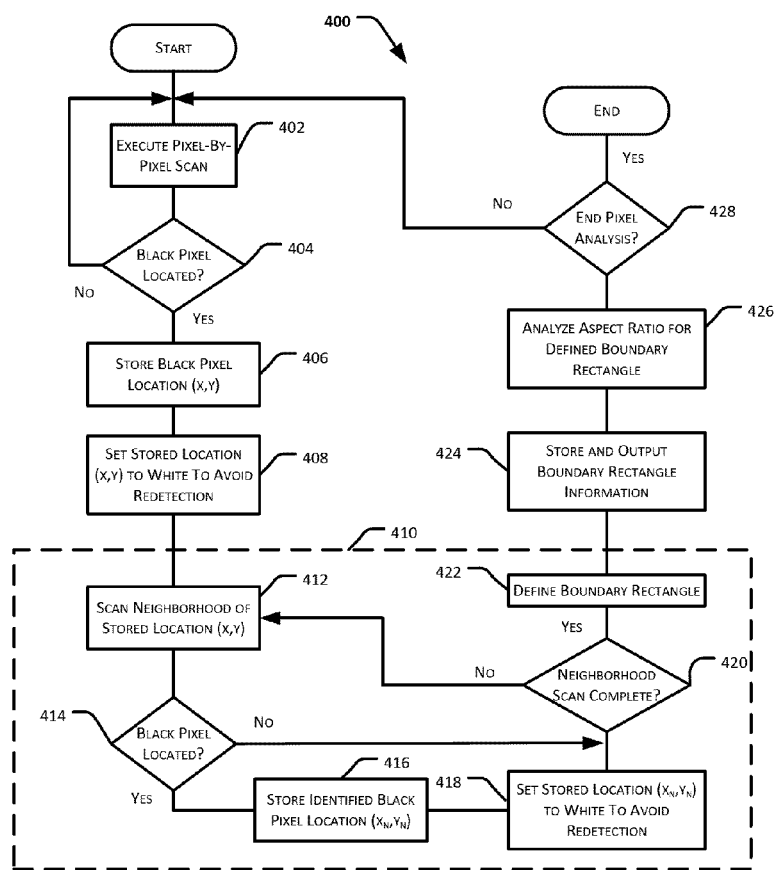
FIG. 4 is a flowchart illustrating an exemplary embodiment of a feature analysis algorithm and process implemented according to the teaching and disclosure provided herein.

Returning to FIG. 3, the PFE algorithm 300 may continue to execute and further analyze the electronic document image. For example, the feature set containing the identified small characters 608 and associated boundary rectangles 508 may be excluded or removed from a subsequent analysis of the electronic document image and the PFE algorithm 300 may make two pixel-by-pixel passes in the manner described above in connection with the pixel analysis algorithm 400 in an attempt to identify small horizontal lines and small vertical lines (step 306) contained within the form 600. In one embodiment, the first pass performed by the PFE algorithm 300 and the pixel analysis algorithm 400 may filter and identify any small horizontal lines having a minimum horizontal (x) length of 15 pixels and an x-buffer of 3 pixels. The buffer defines the neighborhood or horizontal distance within which any two pixels are deemed to be associated with each other. The second pass may filter and identify any small vertical lines having a minimum vertical (y) length of 15 pixels and a y-buffer of 3 pixels that defines the vertical neighborhood.

The PFE algorithm 300 in a similar manner may sequentially exclude the results from the small horizontal and vertical line analysis from a corresponding long or large horizontal and vertical line analysis (step 308). For example, the PFE algorithm 300 analyzes the electronic document image to identify large or long horizontal lines present within the form 600 while excluding both the small character results and the small horizontal lines previously determined and stored in the memory 204. Initially, the PFE algorithm 300 may filter and identify long horizontal lines having a minimum horizontal (x) length of 75 pixels and an x-buffer of 3 pixels. Similarly, the PFE algorithm 300 may exclude both the small character results and the small vertical lines in an attempt to filter any identify long vertical lines within the form 600. In this example, the filter variable associated with identifying long vertical lines may include any line (e.g., series of connected pixels) having a minimum vertical (y) length of 75 pixels and a y-buffer or neighborhood of 3 pixels. The results of these separate analyses can be accessibly stored in the memory 204 for evaluation and/or use in a subsequent filter pass.

At step 310, the PFE algorithm 300 may exclude the long horizontal and vertical results from the form 600 and analyze the remaining pixels to determine and identify dark blocks 602a or regions. A dark block 602a may be defined as any feature having an aspect ratio or area of at least 2000 pixels and a pixel density of 0.55 (or 55% of solid.) Additional filter requirements for the dark block 602a may be a minimum height (y) of 20 pixels and a minimum length (x) of 20 pixels. The neighborhood around pixels of a dark block 602a may extend 8 pixels in a horizontal (x) direction and 6 pixels in a vertical (y) direction. Any line features satisfying these thresholds can be grouped into a line feature set and accessibly stored in the memory 204 for evaluation and/or use in a subsequent filter pass.

At step 312, the PFE algorithm 300 may identify and/or exclude any smudges and other artifacts such as the fax/scanner noise 510 (see FIG. 5B). A smudge may be identified by analyzing the horizontal and vertical components of each boundary rectangle 508 against minimum horizontal and vertical thresholds. In this way, image features calculated to be smaller than the small characters identified at step 304 may be further analyzed and verified. For example, once a boundary rectangle 508 is determined to be a smudge or other small artifact, the PFE algorithm 300 executes a proximity check to determine if the midpoint of the bottom of the boundary rectangle 508 is within 6 vertical (y) pixels of a second boundary rectangle 508. When two boundary rectangles are identified with this specific vertical relationship and relative aspect ratios, the PFE algorithm 300 assumes that the identified smudge or other small artifact is, for example, the dot over an "i" or "j" character. In this way small artifacts may be filtered when they are extraneous to the overall electronic document image and saved when they are determined to be a valid image artifact.

At step 314, the PFE algorithm 300 may identify line crossovers and other instances where small characters 608 and user defined elements intersect with and/or cross one or more of the lines identified in steps 306 and 308. For example, the PFE algorithm 300 analyzes the pixels neighboring each of the identified lines to determine if they are continuously connected to one or more of the lines. Specifically, the PFE algorithm 300 identifies the confluence and intersection of the individual lines and characters in order to identify instances where, for example, the tail of a "y" or "j" passes through a line (see steps 306 and 308). These identified instances may, in one embodiment, be assumed to occur at a location containing user defined elements adjacent to a form feature or line (see step 306 or 308).

At step 316, the PFE algorithm 300 may identify regular or typed characters according to, for example, the principles disclosed in co-pending U.S. patent application Ser. No. 13/220,387, filed on Aug. 29, 2011 and titled "Candidate Identification by Image Fingerprinting and Model Matching." For example, a regular character may be defined as any feature having a minimum aspect ratio or area of at least 20 pixels and a maximum aspect ratio of at least 2000 pixels. This regular character filter may further require each feature or element identified by a boundary rectangle 508 to have a minimum height (y) of at least 6 pixels. The neighborhood around pixels of a regular character may extend 1 pixel in a horizontal (x) direction and 2 pixels in a vertical (y) direction. Any regular characters or other features satisfying these thresholds can be grouped into a common feature set and accessibly stored in the memory 204 for evaluation and/or use in a subsequent filter pass.

The PFE algorithm 300 further analyzes the electronic document image represented by the form 600 to identify words and word features satisfying one or more predefined conditions (step 318.) Unless each of the predefined conditions is met and present within a defined boundary rectangle 508, the PFE algorithm 300 filters and removes the boundary rectangle 508 from further consideration. For example, the PFE algorithm 300 may require a boundary rectangle 508 defined around a word to have a minimum area of 20 pixels, a maximum single word area of no more than 25000 pixels and a minimum height of 6 pixels. In this scenario, the neighborhood around pixels of a word may extend 6 pixels in a horizontal (x) direction and 2 pixels in a vertical (y) direction.

Subsequently, the PFE algorithm 300 performs a pixel-by-pixel analysis to identify lines of connected words (step 320). The connected words include any series of words or characters that extend horizontally at least 10 pixels and vertically at least 8 pixels. The height of any identified connected words cannot, in this example, exceed 60 pixels nor can the overall area or aspect ration ratio exceed 2000 pixels. In this example, the neighbor and/or buffer about each of the lines of connected words and text extend 20 pixels in a horizontal (x) direction and 2 pixels in a vertical (y) direction.

At step 322, the PFE algorithm 300 may identify groups or clusters of regular or small characters that define words or other form features and elements. For example, this exemplary filter may ignore handwriting and other user provided marks when identifying words or other groups of small and/or regular characters. For example, the PFE algorithm 300 identifies Form Char Clusters by examining their proximity to each other (left to right) and their proximity to Form Lines (up/down). The PFE algorithm 300, in this exemplary embodiment, operates under the principle that machine generated/typed text generally utilizes tighter margins than handwritten entries. In this case, the PFE algorithm 300, can search all of the pixels present within the electronic document image and begin defining a cluster boundary rectangle when a small or regular char rectangle (e.g., any pixels within 10 vertical (y) pixels of a detected line) is identified. The PFE algorithm 300 can expand and adjust the boundary rectangle horizontally (x) to encompass any identified series of small or regular characters detected nearby a line (e.g., 2 black pixels detected within 12 horizontal (x) pixels of each other and are no closer than 10 vertical (y) pixels that are also not within 10 vertical pixels of a detected line.)

The PFE algorithm 300 in a similar manner may sequentially exclude the results from the character clusters and dark blocks 602a from a corresponding form horizontal and vertical line analysis (step 324). Further, the PFE algorithm 300 may include the results from the small horizontal and vertical lines (see step 306). For example, the PFE algorithm 300 can analyze the form 600 to filter and identify form horizontal lines having a minimum horizontal (x) length of 100 pixels, an x-buffer of 10 pixels and a y-buffer of 2 pixels. Similarly, the PFE algorithm 300 may identify and filter form vertical lines having a minimum vertical (y) length of 60 pixels, a y-buffer of 10 pixels and an x-buffer of 2 pixels. In this manner, the PFE algorithm 300 attempts to identify and distinguish continuous long horizontal and vertical lines from long lines that are comprised of multiple short lines or line segments. In one embodiment, the PFE algorithm 300 may require that each of the identified long horizontal and vertical lines includes at least 20 percent (20%) of its total pixel length from continuous or long lines as identified at step 308.

At step 326, the PFE algorithm 300 attempts to identify checkboxes 602b utilizing the small line information identified at step 304. In particular, the PFE algorithm 300 analyzes each of the small horizontal lines and small vertical lines to identify intersections therebetween which, in turn, signify the corners of a checkbox 602b. The PFE algorithm 300 further verifies the presence of four evenly spaced intersections and corners. Additionally, the PFE algorithm 300 may verify the existence of some white space surrounding the identified checkbox 602b and that the small lines each have approximately the same thickness.

At steps 328 and 330, the PFE algorithm 300 identifies horizontally and vertically aligned lines based on whether or not the individual lines are determined to have similar (e.g., +/−2 pixels) left or right justified coordinates. The PFE algorithm 300 may identify horizontally and vertically aligned lines utilizing the voting and tallying array disclosed in co-pending U.S. patent application Ser. No. 13/220,387, filed on Aug. 29, 2011 and titled "Candidate Identification by Image Fingerprinting and Model Matching." For example, lines or orientations that receive votes in excess of a predefined threshold (e.g., three (3) or more votes) are considered to be a horizontal or vertical alignment line. The threshold of three (3)votes means that there are least three (3) form lines left or right justified to a location. The PFE algorithm 300 finally calculates the total number of alignment lines present within the electronic document image. If the PFE algorithm 300 identifies more than one (1) or two (2) alignment lines, these lines are assumed to indicate that the electronic document image is a form 600.

At step 332, the PFE algorithm 300 implements a span or catch-all filter configured to identify large features that span the electronic document image. In this example, the span feature filter may be configured to identify any feature having a minimum area or 200 pixels and a maximum area of 40000 pixels. This filter is a catch-all filter configured to identify any large feature or artifacts on the form 600. The filter may further require any identified feature to have a minimum height of 15 pixels and a maximum height of no more than 400 pixels. In this scenario, the neighborhood around pixels of a span feature may extend 20 pixels in a horizontal (x) direction and 3 pixels in a vertical (y) direction.

The results of each filter step 304 to 332 can be individually color-coded to define a heat map or other graphical data representation of the individual locations and size of the features of interest displayed in a colored two-dimensional grid (step 334). Individual heat maps can be overlaid and aligned to identify patterns in the data. These patterns, in turn, can be used to identify X form lines and their locations, Y alignment lines and their location. The information and patterns can further be used to determine which group of data likely represents form pixels such as character clusters, horizontal and vertical form lines as well as form checkboxes, and which group of data are not form pixels. The identified information can be utilized by a document receiving organization to recognize and classify incoming documents based on their detected layout and configuration.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A system for progressive feature evaluation of an electronic document image to identify a user supplied element, the system comprising:
    a controller in communication with a storage device configured to receive and accessibly store a generated plurality of candidate images, wherein the controller is configured to:
    analyze the electronic document image to identify a first feature set and a second feature set, wherein each of the first and second feature sets represents a different form feature;
    compare the first feature set to the second feature set; and
    define a third feature set based on the intersection of the first and second feature sets, wherein the third feature set represents the user provided element;
    wherein identification of the first feature set, identification of the second feature set, and definition of the third feature set are based on a pixel by pixel evaluation of the electronic document image itself without reference to an existing form definition.

2. The system of claim 1, wherein the controller is further configured to:
    associate the user provided element with a form field defined by one or more of the first and second feature sets.

3. The system of claim 2, wherein the controller is further configured to:
    perform an optical character recognition process on the user provided element.

4. The system of claim 3, wherein the controller is further configured to:
    store user data determined by the optical character recognition process in the form fields of a database.

5. The system of claim 1, wherein the first feature set is selected from the group consisting of: characters, words, and text lines.

6. The system of claim 1, wherein the second feature set is selected from the group consisting of: checkboxes, dark blocks, smudges and small characters.

7. The system of claim 1, wherein the second feature set includes checkboxes comprising first and second vertical lines and first and second horizontal lines.

8. The system of claim 1, wherein the first feature set constitutes a first heat map layer.

9. The system of claim 8, wherein the second feature set constitutes a second heat map layer.

10. A computer-implemented method for progressive feature evaluation of an electronic document image to identify a user supplied element, the method comprising:
    receiving an electronic document image comprising a plurality of pixels arranged to define a plurality of features;
    analyzing each of the plurality of pixels to define a first feature set based on one of the plurality of features;
    analyzing each of the plurality of pixels to define a second feature set based on one of the plurality of features;
    comparing the plurality of pixels associated with the first feature to the plurality of pixels associated with the second feature; and
    isolating the user provided element based on the intersection of the pixels associated with the first feature set and the pixels associated with the second feature set;
    wherein definition of the first feature set, definition of the second feature set, and isolation of the user provided element are based on a pixel by pixel evaluation of the electronic document image itself without reference to an existing form definition.

11. The method of claim 10 further comprising:
    determining a form field based on the comparison of the first and second features sets.

12. The method of claim 11 further comprising:
    associating the user provided element with a corresponding form field.

13. The method of claim 12 further comprising:
    converting the user provided element into one or more alphanumeric characters.

14. The method of claim 13 further comprising:
saving groups of the alphanumeric characters in retrievable storage locations corresponding to the form field.

15. The method of claim 10, wherein analyzing each of the plurality of pixels to define the first feature set includes defining a boundary rectangle around each individual feature of the first feature set.

16. The method of claim 15, wherein the individual feature is selected from the group consisting of: characters, words, and text lines, checkboxes, dark blocks, smudges and small characters.

17. A computer-implemented method for progressive feature evaluation of an electronic document image to identify a user supplied element, the method comprising:
defining a plurality of features within an electronic document image representing a form, wherein each of the features within the electronic document image is composed of a plurality of pixels;
performing a pixel-by-pixel analysis of the plurality of pixels based on a first form characteristic to define boundary rectangles around each of the plurality of features;
grouping the plurality of features into a first feature set based on the defined boundary rectangles;
performing a pixel-by-pixel analysis of the plurality of pixels based on a second form characteristic to define boundary rectangles around each of the plurality of features;
grouping the plurality of features into a second feature set based on the defined boundary rectangles; and
comparing the first feature set to the second feature set to identify a third feature set within the electronic document image, wherein the third feature set represents at least one user provided element;
wherein determination of the first feature set, determination of the second feature set, and identification of the third feature set are based on a pixel by pixel evaluation of the electronic document image itself without reference to an existing form definition.

18. The method of claim 17 further comprising:
identifying at least one form field within the plurality of pixels.

19. The method of claim 18 further comprising:
associating the at least one user provided element with a corresponding at least one form field.

20. The method of claim 17, wherein the first form characteristic corresponds to characters.

21. The method of claim 17, wherein the first form characteristic corresponds to words.

22. The method of claim 17 further comprising:
identifying each of four line components comprising a checkbox within the features of the electronic document image.

23. The method of claim 17 further comprising:
identifying each of a dark space within the features of the electronic document image.

24. The method of claim 17 further comprising:
identifying a text line within the features of the electronic document image.

* * * * *